United States Patent [19]
Elonen et al.

[11] Patent Number: 5,240,621
[45] Date of Patent: Aug. 31, 1993

[54] METHOD AND APPARATUS FOR IMPROVING FLOTATION SEPARATION

[75] Inventors: Jorma Elonen, Jamsankoski; Harry Erlund, Espoo; Kaj Henricson, Kotka; Pasi Immonen, Savonlinna; Raimo Kohonen, Savonlinna; Heikki Manninen, Ummeljoki; Kari Peltonen; Raimo Pitkanen, both of Karhula; Pentti Vikio, Kerimaki, all of Finland

[73] Assignee: A. Ahlstrom Corporation, Noormarkku, Finland

[21] Appl. No.: 737,247

[22] Filed: Jul. 29, 1991

[30] Foreign Application Priority Data

Aug. 14, 1990 [FI] Finland .................................. 904003

[51] Int. Cl.$^5$ ....................... B01D 21/20; B01D 21/26
[52] U.S. Cl. ..................... 210/787; 210/703; 210/767; 210/221.2; 209/144; 209/211; 55/459.1; 162/4; 162/28; 162/55; 162/63; 415/169.1; 415/171.1; 95/260; 96/200
[58] Field of Search ............... 210/703, 718, 767, 787, 210/221.2; 209/144, 211; 55/52, 194, 459.1; 415/169.1, 171.1; 162/4, 28, 55, 63

[56] References Cited

U.S. PATENT DOCUMENTS

| | | | |
|---|---|---|---|
| 4,872,953 | 10/1989 | Smith | 162/261 |
| 4,921,400 | 5/1990 | Niskanen | 415/169.1 |
| 4,977,943 | 12/1990 | Miyabe | 210/221.2 |
| 4,986,903 | 1/1991 | Canzoneri et al. | 210/221.2 |
| 5,080,802 | 1/1992 | Cairo, Jr. et al. | 210/221.2 |

FOREIGN PATENT DOCUMENTS

| | | |
|---|---|---|
| 0440455A1 | 8/1991 | European Pat. Off. |
| 0447887A1 | 9/1991 | European Pat. Off. |
| 2904326B2 | 7/1981 | Fed. Rep. of Germany |
| 2177943A | 2/1987 | United Kingdom |

*Primary Examiner*—Robert A. Dawson
*Assistant Examiner*—David Reifsnyder
*Attorney, Agent, or Firm*—Cohen, Pontani, Lieberman, Pavane

[57] ABSTRACT

A method of separating an aqueous solids containing suspension includes (a) subjecting a first solids containing suspension to centrifugal forces so as to separate the suspension into a first gas containing flow, a second gas-free flow and a third flow; (b) feeding the third flow into a flotation cell having a bottom; (c) introducing air at the bottom of the flotation cell into the third flow for separating from the third flow a fourth partial flow; (d) withdrawing the air containing third flow after the separation of the fourth partial flow from the flotation cell; and (e) subjecting the third flow to the centrifugal forces of step (a). An apparatus for the separation of gas and lightweight material from a gas and lightweight material containing aqueous solids suspension is also described and includes a centrifugal pump for separating the gas and lightweight material from the solids suspension with a suspension inlet and an outlet for the lightweight material; a flotation cell for separating the lightweight material from a solids suspension; and a circulation loop connecting the outlet of the centrifugal pump, the flotation cell and the suspension inlet of the pump.

11 Claims, 3 Drawing Sheets

METHOD AND APPARATUS FOR IMPROVING FLOTATION SEPARATION

FIELD OF THE INVENTION

The present invention relates to an improved method and apparatus for separating material flows such as paper pulp or other corresponding material suspensions by a flotation process, e.g. for the removal of ink particles, pigments and other contaminants in deinking of repulped fiber suspensions of for the enrichment of ores.

BACKGROUND OF THE INVENTION

Gas is present in pulp suspensions mainly in three forms, namely, in the form of small bubbles, dissolved or chemical bound gas.

The chemically bound gas or dissolved gas seldom causes problems in the pulp and papermaking processes but can cause problems if conditions are changed and bubbles start to form.

Gas bubbles in the fiber suspension can be present as free bubbles in the liquid between the fibers or as bound bubbles attached to fibers. Both bound and free bubbles cause problems in the papermaking processes. Free bubbles cause special problems in the pulp and papermaking processes when they are present in too great an amount. The problems include foam problems, instability of the processes, decreased deaerating, and the like.

The method of the present invention relates to the separation and removal of most of the free air bubbles so that the problems caused by an excess amount of free air bubbles is eliminated.

Total gas removal is generally accomplished by another type of gas removal, so-called mechanical gas separation. With this method, all of the free and bound gas bubbles are removed. Also part of the dissolved gas is removed. This type of gas removal is performed immediately in front of the paper machine forming section to avoid pinholes and other problems on the forming wire. This method, which is described by K. D. Kurz, Tappi Engineering Conference, Sept. 19-21, (1978), is expensive and creates large amounts of foam when the fiber suspension is ejected with high speed onto a metal surface in a vacuum tank.

The traditional degassing assemblies in the pulp and paper industry are remarkably space demanding and hence costly, and the separated gas occurs in large volumes, from which reclaiming and conveying thereof is difficult. The most usual degassing equipment is a tank having a large diameter in which the gas in a gas contained liquid is permitted to rise to the liquid surface of the tank for removal. In order to be certain that a sufficient time period for degassing is given, the diameter of such a tank in large pulp plants can be 10-20 m and the height 5-6 m. It will thus be apparent to persons of ordinary skill that investment costs for a degassing tank of this kind are high and the reclaiming of gas therefrom is difficult.

According to a prior art technique differences in surface characteristics, rather than density, can be utilized to separate many materials by froth flotation processes. These material suspensions, be they coal, ores, fiber suspensions in the pulp and paper industry, or the like, are hereinafter referred to as suspensions. Flotation washing systems generally include one or more special flotation cell or tank which is an open or closed vat, or a series of vats, so as to provide a large free liquid surface for the formation of air bubbles. Each flotation cell is generally equipped with a high-speed agitator and an overflow for froth removal. The agitator causes gas to enter the system, to combine with the paper stock and flotation chemicals and to form air bubbles, e.g. in flotation deinking processes ink-laden air bubbles which will rise to the surface of the cell to be removed therefrom. As will be further discussed below, the separation operation can be improved by the addition of air into the flotation cell or by feeding into the flotation cell of soap-type chemicals such as fatty acid soaps with a suitable feed pump.

A partition wall or overflow is generally provided inside the flotation cell which overflow extends to a predetermined height thereby defining an upper limit for the liquid surface formed by the suspension inside the cell. The suspension inside the cell is treated with air and chemicals for generating upward rising air bubbles. Ink particles, pigments or other contaminants attached to the surface of the air bubbles while they rise to the surface of the suspension to form foam or froth thereon. The foam or froth together with the particles stuck thereto will thereafter flow over the partition wall mentioned above or may be skimmed off with a mechanical paddle or, e.g. by directing the foamy surface layer into a separate outlet duct for removing the contaminant containing fraction for disposal or further recovery, if so desired. The treated suspension, so-called floated suspension, is thereafter transferred from the bottom section of the flotation cell for further processing.

However, this prior art technique will only achieve a partial separation because not all of the material or all of the particles intended to be separated will be sufficiently attracted to the rising air bubbles, rather, part of the particles as well as air will remain in the suspension. Particles remaining in the suspension, if they are valuable are hard to be recovered or entirely lost, or, if the particles are of no value, the continued presence thereof will invariably cause problems in most subsequent process steps. Problems caused by the presence of gas in the suspension include pump cavitation and, especially, in the pulp industry the presence of air causes the following problems:

Free Air:

foam problems
needle perforations of paper
instability of the suspension in pipes, screens, valves etc.
decreased dewatering Combined Air:

dewatering problems
fiber flocculation
increased capillarity in paper
decreased formability on the wire of a paper machine Dissolved Air:

no particular problem as long as it does not transform into combined air.

As used throughout this specification (including claims), the word "gas" is intended to include any and all gases, whether free, combined or dissolved, including by way of example only air; and the expression "deaerating pump" or "degassing pump" is intended to mean a centrifugal pump capable of separating gas (as above defined) from the working liquid passing through the pump, which includes a gas channel for conveying separated gas from a zone upstream of or in front of the impeller to a zone downstream of or in back of the impeller, said pump further including a vent to permit the removal of said separated gas from the pump. Examples of suitable deaerating pumps are a pump sold as a degassing MC® pump by the assignee of the present invention, A. Ahlstrom Corporation, another pump sold by said assignee under the trademark AHLSTAR ™ equipped with AIRSEP ™ degassing. Also, as used herein, the term "liquid" is intended not only to embrace liquids as conventionally defined but also slurries and suspensions which flow like liquids or are caused to flow through a deaerating pump like a liquid.

SUMMARY OF THE INVENTION

It is an object of the present invention to improve the separation processes based on the known flotation technique and to overcome the above-mentioned problems and disadvantages caused by an incomplete separation and by impure fractions remaining in the suspension after the separation process. In its broadest sense, this object is achieved by feeding a solids containing suspension into a flotation cell; treating said solids containing suspension by introducing gas at the bottom of said flotation cells so as to create treated gas containing suspension withdrawing said treated gas containing suspension from said flotation cell; subjecting said treated suspension in a pump to centrifugal forces so as to separate said suspension into a gas containing flow and a substantially gas-free flow; and removing said gas containing flow from said pump.

Further objects of the method and apparatus of the present invention are achieved by (a) subjecting a first solids containing suspension to centrifugal forces so as to separate said suspension into a first gas containing flow, a second gas-free flow and a third flow;

(b) feeding said third flow into a flotation cell having a bottom;

(c) introducing air at said bottom of said flotation cell into said third flow for separating from said third flow a fourth partial flow; (d) withdrawing said air containing third flow after said separation of said fourth partial flow from said flotation cell; and (e) subjecting said third flow to said centrifugal forces of step (a).

In accordance with the present invention the suspension to be recycled, cleaned or separated is subjected before or after the flotation cell to means for degassing and deaerating the same. Preferably, this degassing or deaerating means is a degassing pump which feeds the subject suspension to or discharges the suspension from the flotation cell, whereby the degassing means will advantageously remove from the suspension the lightweight fraction principally in the same manner as in the flotation cell, i.e. the apparatus will remove a lightweight fraction containing desirable or waste material which may then be conducted either directly into an outlet conduit for the lightweight fraction or, more preferably, recycled back into the flotation cell thus considerably improving the effect of the separation process and, at the same time, providing a substantially air-free suspension which will greatly facilitate further treatment thereof. By "lightweight fraction" is meant a flow of material which may contain lightweight contaminants which are without value and intended to be discarded but also material which is intended to be recovered. It is also understood that the present invention is not limited to flotation process in the pulp and paper industry.

In a further preferred embodiment, the heavy fraction is discharged from the flotation cell and subjected to an additional separation treatment to remove additional light material therefrom before the heavy fraction containing flow is recycled to the suction side of the deaerating means, or the recycled flow of the lightweight fraction exiting from the deaerating means is subjected to a further separation treatment to remove additional lightweight material therefrom before the flow is recycled to the feed or approach side of the flotation cell. By this procedure, the separation capacity with respect to the lightweight fraction attained by the subject separation is substantially improved. For example, in the flotation deinking process of paper pulp this improved deinking performance will result in improved brightness of the pulp, and in an ore enrichment process in an improved yield of valuable minerals.

Both, the separated foam or froth and the suspension exiting from the flotation cell contain large amounts of air. The presence of large amounts of air in these partial flows renders difficult the treatment thereof including, among other things, the pumping and the controlling of the flow thereof. Also, subsequent treatment of the fiber suspension, e.g. by thickening, becomes difficult due to the large amount of air. These and other corresponding problems can be avoided by treating the foam and/or the suspension in accordance with the present invention.

As mentioned, according to a preferred embodiment of the invention the recycle flow containing the lightweight fraction exiting from the means for deaerating the suspension, for example from a deaerating pump, and the outlet flow of the floated suspension leaving the flotation cell, which flows may contain in addition to the fiber suspension, e.g. lightweight contaminants such as flotation residuals, ink, pigments, bark and the like, are directed to a further separating device for removing these lightweight contaminants therefrom. A suitable apparatus for the removal of this material includes, for example, means for screening the material including a perforated screen having small size perforations in the range of from about 0.01 to 0.2 mm, flotation washing, reversed centrifugal cleaning or treatment in yet another flotation cell. The reclaimed and floated stock having greatly reduced impurity content is thereafter recycled either to the suction side of the pump or to the feed conduit of the flotation cell.

BRIEF DESCRIPTION OF THE DRAWINGS

The present invention is described in the following by way of example and with reference to the accompanying drawings, wherein.

DETAILED DESCRIPTION OF THE PRESENTLY PREFERRED EMBODIMENTS

The present invention is further explained by reference to the deinking of repulped waste paper or paper boards. It is, however understood that the present invention is equally applicable to other processes involving flotatioon or the equivalent thereof. Flotation utilizes the phenomenon that the minerals which are present in the ground ore can partially be wetted, i.e. they are hydrophilic, while other parts of the minerals are hydrophobic. Hydrophobic particles have a clear affinity to air. Accordingly, finely distributed air is introduced into the solid-water-mixture so that the air will attach to the hydrophobic particles causing them to rise to the surface of the mixture or suspension. The hydrophobic particles, such as valuable minerals or the above-mentioned contaminants present in repulped stock suspensions, collect as froth at the surface of the suspension and are skimmed off with a suitable means such as a paddle or weir. The hydrophilic particles of the ore or stock suspension remain in the flotation vat. It is also possible to separate two or more useful minerals selectively by the flotation method, for example, in the separation of sulfidic lead/zinc ores. For controlling the surface properties of the minerals small amounts of additives of chemical agents are introduced such as, for example, foaming agents which will help to stabilize the air bubbles, so-called collecting agents which actually cause the hydrophobic effect and prepare the mineral particles for attachment to the air bubbles, and floating agents which temporarily impart hydrophilic properties to the hydrophobic minerals and later return the hydrophobic properties for selective flotation, as mentioned above. The latter are generally inorganic compounds, mostly salts, while the collectors are mostly synthetic organic compounds, and the foaming agents are oily or soapy chemicals such as fatty acid soap.

Figure 1:
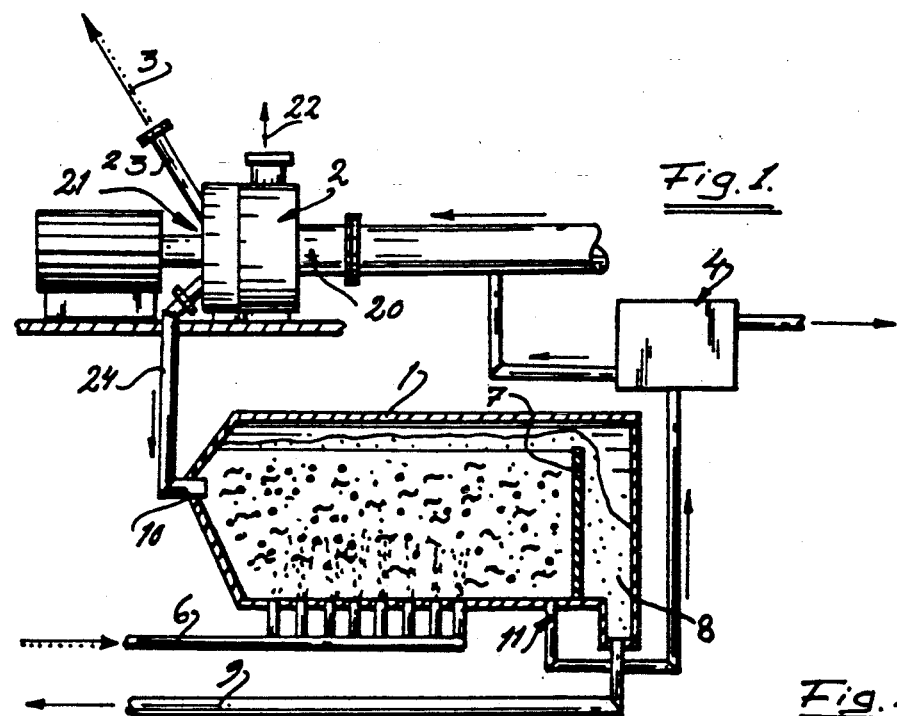
FIG. 1 illustrates schematically a first preferred embodiment of the present invention.
Figure 2:
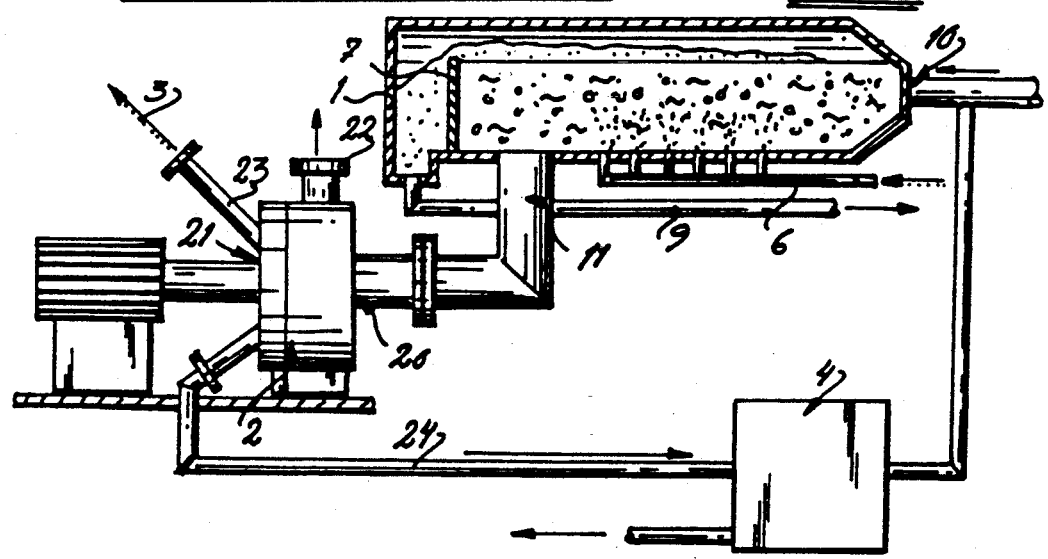
FIG. 2 illustrates schematically a second preferred embodiment of the present invention.

FIGS. 1 and 2 show a closed, essentially cylindrical flotation cell 1, a deaerating and/or degassing pump 2 for recycled pulp suspension which are connected by conduits to form a flow connection with each other as is further explained below.

As shown in FIGS. 1 and 2, both degassing pumps 2 for the repulped fiber suspension in the separation apparatus according to the present invention include, at the approach or feed side thereof, one inlet or feed duct 20 for introducing the suspension to be treated to the pump. The discharge side 21 of the pump is provided with three outlet ducts: first, a pulp discharge conduit 22 for an essentially gas-free fiber suspension leading to further pulp treatment stages; second, a discharge conduit 23 serving as an exhaust for gases separated in the pump; and third, a recycle conduit 24 for returning the lightweight contaminant and other lightweight material containing fraction, the so-called lightweight fraction, which may contain a small amount of gas and fiber suspension, back to the main flow either toward the pump or the flotation cell.

In suspension pump 2, due to the action of centrifugal forces, air and other gases and with them a lightweight material containing fraction are separated and collected at the center of a turbulence zone in front of the pump impeller, and due to the lighter weight thereof separated from the heavier fiber suspension. The separated gaseous mixture of fibers and lightweight material or contaminants flows through one or more suitable impeller opening to the back side of the impeller into a so-called back space, which is in fluid communication with the discharge conduit 23 for the gas containing part thereof and with recycle conduit 24 to return part of the fraction containing fiber suspension back to the main flow. As mentioned above, a substantially air-free or gas-free stream of fiber suspension is discharged from conduit 22.

Repulped fiber suspension or stock and preferably any lightweight fraction separated from the repulped stock together with dispersing, flotation and bleaching chemicals enter the flotation cell 1 at one end thereof. Air is introduced at the bottom of the flotation cell through a suitable distribution system 6. The air causes, inside flotation cell 1, a rising flow of bubbles to which pigments and ink particles will attach and remain suspended thereby due to their small size and hydrophobic properties. Due to the influence of chemicals such as dispersing agents, foaming agents and flotation chemicals such as fatty acid soaps and calcium chloride, as well as the air, a foam layer is formed and stabilized at the surface of the suspension. As mentioned, an agitator can also be used. The foam or froth is skimmed off from the surface of the suspension by permitting it to flow over the overflow or weir 7 into a discharge space 8, from where the foam is removed through an ink discharge conduit 9. The floated suspension is discharged from the bottom of the flotation cell 1 into a suspension discharge conduit 11.

The main difference between the first and second embodiments of the present invention is that, in accordance with the first embodiment illustrated in FIG. 1, the suspension pump 2 operates as a feed pump of the flotation cell 1, while in FIG. 2, the suspension pump 2 operates as a discharge pump of the flotation cell 1. Above-mentioned embodiments and advantages flowing therefrom are described in more detail in the following.

In accordance with a first preferred embodiment, and as illustrated in FIG. 1, a repulped fiber suspension after it has been subjected to some initial cleaning stages, such as centrifugal cleaners and screeners, is pumped with a degassing or deaerating pump 2, at least partially, to a flotation cell 1. The rotating action of the suspension pump 2 separates the gas containing lightweight fraction from an essentially air-or gas-free flow. To recycle this gas and impurities containing lightweight fraction, the fraction is fed through recycle conduit 24 into the inlet 10 of flotation cell 1, wherein the waste lightweight material is separated as froth or foam and skimmed off, as described above.

It should be noted that a degassing pump may also be placed into discharge conduit 9 for degassing the froth exiting from flotation cell 10.

The floated fiber suspension, is fed back to the suction side 20 of the suspension pump 2. Advantageously, the refined or floated fiber suspension is recycled from the flotation cell into a conduit for unrefined repulped fiber suspension upstream of the suspension pump 2 or into a conduit leading to another flotation cell operated in series with the first cell. In this connection, it should be noted, that, in order to increase the separation effect of the separation apparatus including deaerating or degassing suspension pump 2, flotation cell 1, and recycle conduit 24, two or more of these apparatuses can be arranged in series with the possibility of operating two or more pumps in series, two or more flotation cells or two or more complete units in series with pump, flotation cell and recycle conduit or any other combination.

In the first preferred embodiment, the suspension pump 2 essentially creates the pressure difference required to recycle suspension via the flotation cell 1 to the suction side of suspension pump 2. Deaerating and degassing pump 2 has, in addition to this feed function, also the function of deaerating and degassing the suspension which enables the separation of ink, generally as a lightweight fraction, together with gas and air. The same pumping action also separates gas from the main suspension flow into the pulp conduit 22 which will facilitate further treatment thereof.

FIG. 1 also illustrates a supplemental separation apparatus 4 which may be used in combination with the present invention, if so desired. Any lightweight material which is still remaining in the outlet suspension flow 11 of the flotation cell 1 is removed by apparatus 4 before the suspension is recycled to the suction side 20 of deaerating and degassing pump 2. This additional cleaning step can be accomplished by any suitable means such as, for example, a slit screen, flotation, reversed centrifugal refining, or a second flotation cell.

According to the second preferred embodiment of the present invention, FIG. 2 shows a separation method, wherein the suspension to be refined flows from a flotation cell 1 via suspension discharge conduit 11 into a degassing and deaerating pump 2 and wherein a recycle flow 24 containing a lightweight fraction separated by the suspension pump is recycled to the feed side 10 of flotation cell 1, for example, into a pipe conducting unrefined reclaimed pulp into the flotation cell 1. Degassing and deaerating pump 2, which, like the suspension pump of the first embodiment, creates essentially the pressure difference required for transferring the suspension and which pump performs, not only the suspension recycling function but also the function for separating gas and air from the suspension. As already mentioned above, lightweight impurities, such as ink, are separated in addition to gas and/or air from the suspension to be pumped in the turbulence zone of the pump. Hence, the separation capacity for lightweight impurity fractions is increased per separation cycle of the separation apparatus. Like the above described separation apparatus, this second preferred embodiment of the present invention can also be arranged in series, several one after the other, for further improving the removal of impurities from the fiber suspension.

In the arrangement according to FIG. 2, pump 2 pumps the fiber suspension or stock exiting the flotation cell 1 through conduit 11. It is clear that this flow contains a large amount of residual gas and foam which will impede the operation of the pump as well as the handling of the suspension in any subsequent process stage. The degassing or deaerating pump, in accordance with the present invention, substantially improves the operation and efficacy of the floatation system by separating air and/or gas from the suspension which is to be treated by the flotation plant.

FIG. 2 also illustrates an additional separation arrangement 4 which can be used to complement the separation system described above, if so desired. Lightweight material contained in the lightweight fraction separated by and exiting at the discharge side 21 of suspension pump 2 is removed therefrom before said fraction or flow is recycled to the feed side 10 of the flotation cell. As in the first embodiment, this is accomplished by any suitable means such as, for example, a slit screen, floatation, reversed centrifugal purification, or another flotation cell.

Figure 3:
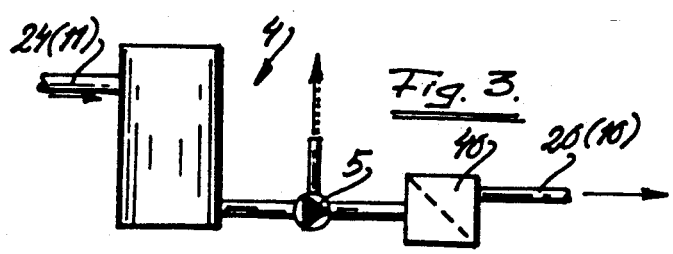
FIG. 3 illustrates schematically yet another preferred embodiment of the present invention for further separating lightweight material from a floated suspension.

FIG. 3 illustrates a preferred solution for additionally refining the recycled suspension flow exiting from flotation cell 1 or for refining the lightweight fraction recycle flow 24 exiting from suspension pump 2, before the recycle suspension flow is fed to the suction side 20 of suspension pump 2 (FIG. 1) or to the approach side 10 of flotation cell 1 (FIG. 2), respectively.

In this embodiment, the refined process flow exiting separation means 4 is further subjected to the action of a pump separating gas and air before introducing the flow into a further separation apparatus 40 which may be a screen with fine holes or slots. This ensures a trouble-free process as a part of the impurities is removed together with the gas and air piror to separation apparatus 40, thus permitting the separation apparatus to be designed for a reduced capacity.

Figure 4:
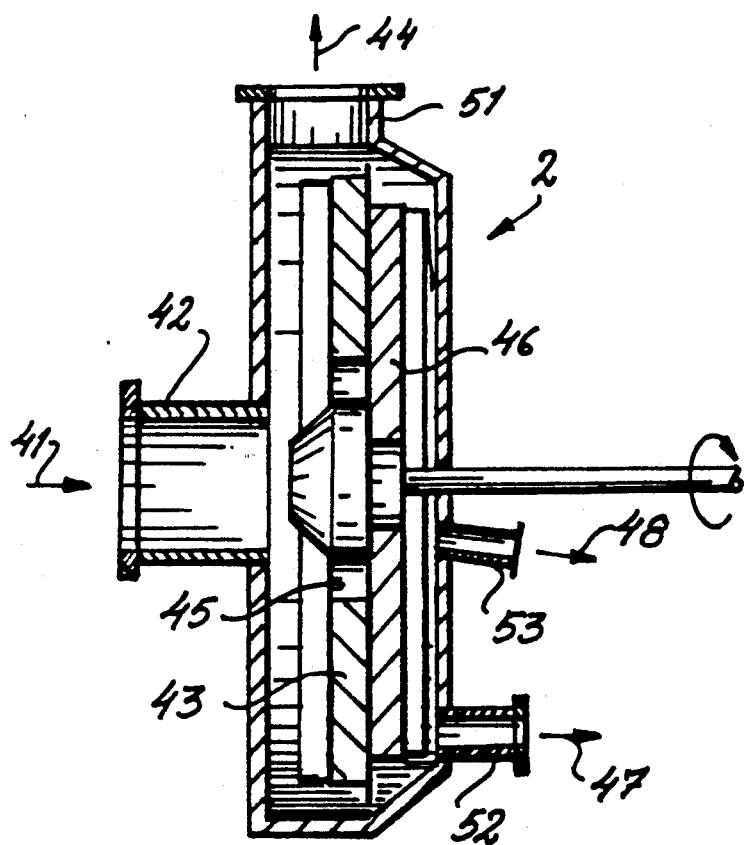
FIG. 4 illustrates schematically an apparatus for separating air and lightweight fraction in accordance with a preferred embodiment of the present invention.

FIG. 4 shows a cross-sectional view of a degassing or deaerating suspension pump 2 according to a preferred embodiment of the present invention. By the pumping action of the apparatus a lightweight fraction 47 as well as an air and/or gas containing flow 48 are separated from the suspension 41 to be pumped. Lightweight fraction 47 is then recycled, as mentioned above, as recycle flow 24 directly, or via a suitable additional separation apparatus, for example, to the approach side of the flotation cell. As shown in FIG. 4, suspension pump 2 includes one inlet duct 42 for a flow 41 entering the pump, and three outlet ducts for flows exiting the pump. The first duct is discharge duct 51 for the treated, i.e. degassed fraction 44, the second is the discharge duct 52 for the lightweight fraction 47 and the third is the discharge duct 53 for the air and/or gas. The pump includes an inlet 42 for suspension to be pumped concentric with an impeller 43 which is rotatably mounted within the pump housing. While the impeller 43 is rotating, the suspension, due to the effect of centrifugal forces, is divided into a heavier fraction 44 which will move to the outer periphery of the impeller 43 and further into the discharge duct 51 for further processing, while the lighter fraction of the suspension, i.e. the fraction containing some fiber suspension and both lightweight material and air or gas, is collected at the center of the pump housing in front of the impeller hub. For further discharging air and/or gas and the lightweight fraction from the pump housing there is provided one or more openings or channels 45 extending through the impeller 43 toward the backside of teh impeller into a back space. A set of separation or back vanes 46 is located in this back space for separating the lightweight fraction 47 from the air and/or gas 48 so that the lightweight fraction 47 moves to the outer periphery of the back space, while the air and/or gas remains at the center thereof. Air and/or gas 48 are exhausted from the center via discharge duct 53 advantageously into a suitable collection vessel or container. The lightweight fraction 47 exiting from the outer periphery of the back space via discharge duct 52 is fed into recycle flow 24. If necessary, the gas and/or air discharge duct is connected to a vacuum system for assisting the removal of gas from the pump.

Figure 5:
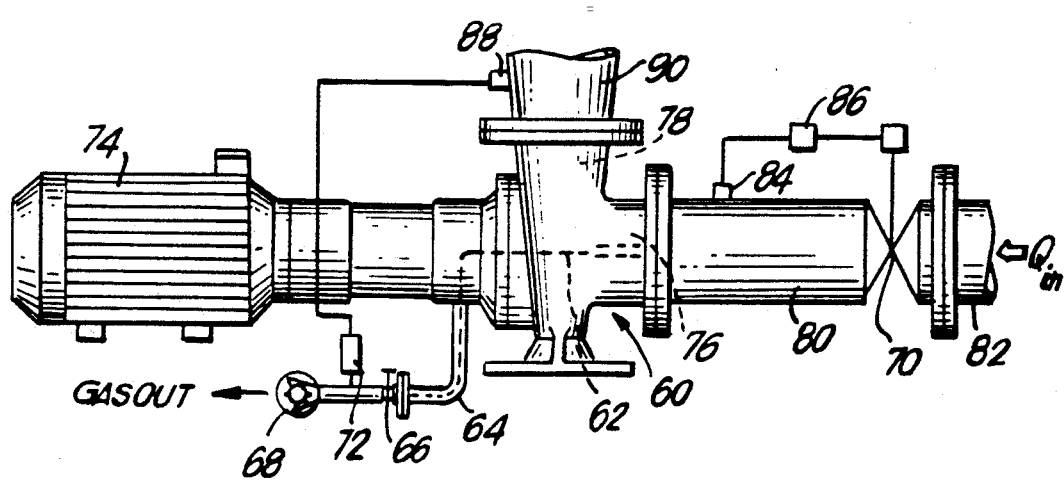
FIG. 5 is a schematic illustration of a preferred control circuit for a degassing pump for practicing the present invention.

As shown in FIG. 5, the deaerating pump for use with the apparatus and method of the present invention preferably comprises a centrifugal pump 60 with a channel 62 within the pump which is connected to an exterior gas discharge pipe 64, and via valve 66 to a suction or vacuum pump 68, which can be, for example, a well-known NASH-pump. The drawing alos schematically illustrates control valves 70, 72 for controlling the reduced pressure generated by suction pump 60. The centrifugal pump 60 has, as is known, a motor 74, a suction opening 76 and a pressure opening 78. A suction duct 80 is mounted to the suction opening. The duct 80 is connected by valve 70 to the inlet pipe 82 for the fiber suspension. The control circuit further comprises a pressure sensor 84 connected to the suction duct 80 and a control unit 86 which is connected to valve 70 to regulate the operation of the valve.

In operation, the fiber suspension is drawn by pump 60 into suction duct 80 through valve 70 from inlet pipe 82. The flow is constricted by valve 70 in such a way that a reduced pressure is generated in the suction duct and in the suction opening 76 of the pump thereby facilitating the separation of gas from the fiber suspension. Hence, the flow is throttled as much as possible short of avoiding boiling thereof thereby maximizing air removal. Pressure sensor 84 in the control circuit and control unit 86 maintain the pressure in the suction duct sufficiently high to prevent the suspension from boiling due to the reduced pressure. In this manner the amount of gas separated from the suspension in front of the impeler is as great as possible and the separated gas is discharged from the centrifugal pump 60 via the conventional route. Thus, centrifugal pump 60 is pumping suspension through pressure opening 78 and the gas content of the suspension is considerably lower than that of the suspension in the inlet pipe 82. Control unit 72 and pressure sensor 88 also control the pressure difference between the air bubble created in front of the pump impeller and the pressure in discharge pipe 90 to maintain the pressure differential at the desired level.

Although the present invention has been described above only with respect to the deinking of repulped stock, it is not intended to be so limited. As is evident to any person having ordinary skill in the art, several applications, structural alternatives, variations and combinations are possible within the scope of the present invention which is properly delineated only in the accompanying claims. For example, in addition to pulp suspensions, the present invention can be used for refining, enriching etc. of different flowable materials such as minerals and especially ores and the like.

What is claimed is:

1. A method of separating an aqueous solids containing suspension comprising:
   (a) subjecting a first solids containing suspension to centrifugal forces so as to separate said suspension into a first gas containing flow, a second gas-free flow and a third flow;
   (b) feeding said third flow into a flotation cell having a bottom;
   (c) introducing air at said bottom of said flotation cell into said third flow for separating from said third flow a fourth partial flow;
   (d) withdrawing said air containing third flow after said separation of said fourth partial flow from said flotation cell; and
   (e) subjecting said third flow to said centrifugal forces of step (a).

2. The method of claim 1, comprising the additional step of
   (f) admixing a second aqueous solids containing suspension flow with said first solids containing suspension prior to subjecting said first suspension to said centrifugal separation to form a mixture; and
   (g) performing steps (a) through (e) with said mixture.

3. The method of claim 1, additionally comprising the step of
   (h) admixing a second aqueous solids containing suspension flow with said third flow prior to feeding said third flow to said flotation cell in step (b) to form a mixture; and
   performing steps (c) through (e) and (a) with said mixture.

4. The method of claim 1, wherein said solids containing suspensions are aqueous suspensions of cellulose fibers containing lightweight material; wherein step (a) is performed so that said lightweight material is contained in said third flow; and
   step (c) is performed so that said lightweight material is separated as said fourth partial flow from said third flow comprising fiber suspension.

5. The method of claim 4, containing the additional step of
   (i) subjecting said third flow to a further separation step between said centrifugal separation of step (a) and said admixing with said second suspension flow of step (h).

6. The method of claim 5, containing the additional step of
   (j) removing air from said third flow by subjecting said third flow after separation step (i) to a further centrifugal separation action; and
   (k) further cleaning said flow by screening thereof.

7. A method of separating gas and lightweight material from a gas and lightweight material containing suspension of cellulose fibers, said method comprising:
   (a) feeding said gas and lightweight material containing fiber suspension to a separation zone;
   (b) subjecting said fiber suspension in said separation zone to centrifugal forces for separating said fiber suspension into a first substantially gas-free flow comprising said fiber suspension, a second flow comprising said gas and a third flow comprising said lightweight material;
   (c) feeding said third flow comprising said lightweight material into a flotation cell;
   (d) introducing gas into said flotation cell for separating said lightweight material from said third flow to obtain a gas containing floated fiber suspension;
   (e) withdrawing said gas containing floated fiber suspension from said flotation cell; and
   (f) feeding said gas containing floated fiber suspension to said separation zone of step (a) for removing said air therefrom.

8. The method of claim 7, wherein said floated fiber suspension of step (e) is mixed with said gas and lightweight material containing fiber suspension prior to performing step (b).

9. The method of claim 7, wherein said lightweight material is selected from the group consisting of ink and pigments, and said suspension cellulose fibers is repulped stock.

10. A method of separating gas and lightweight material from a gas and lightweight material containing suspension of cellulose fibers, said method comprising:
    (a) feeding said gas and lightweight material containing fiber suspension into a flotation cell;
    (b) separating said lightweight material from said fiber suspension by bubbling gas through said fiber suspension to generate a foam layer and gas containing floated fiber suspension;
    (c) withdrawing said gas containing floated fiber suspension from said flotation cell;

(d) subjecting said gas containing floated fiber suspension to centrifugal forces to separate said floated fiber suspension into a first substantially gas-free flow comprising said cellulose fibers, a second flow comprising said gas; and a third flow comprising said lightweight material; and (e) recycling said third flow back into said flotation cell.

11. The method of claim 10, wherein said gas and lightweight material containing fiber suspension is repulped stock and wherein said lightweight material is selected from the group consisting of ink and pigments.

* * * * *